(12) United States Patent
Bortoli

(10) Patent No.: US 10,087,114 B2
(45) Date of Patent: Oct. 2, 2018

(54) BIOCATALYTIC COMPOSITION FOR TREATMENT OF SUBSTRATES

(71) Applicant: Elio Fabio Bortoli, Claro (CH)

(72) Inventor: Elio Fabio Bortoli, Claro (CH)

(73) Assignee: BIOMA SA, Quartino (CH)

( * ) Notice: Subject to any disclaimer, the term of this patent is extended or adjusted under 35 U.S.C. 154(b) by 93 days.

(21) Appl. No.: 15/115,811

(22) PCT Filed: Feb. 11, 2015

(86) PCT No.: PCT/IB2015/051013
§ 371 (c)(1),
(2) Date: Aug. 1, 2016

(87) PCT Pub. No.: WO2015/121798
PCT Pub. Date: Aug. 20, 2015

(65) Prior Publication Data
US 2017/0008814 A1    Jan. 12, 2017

(30) Foreign Application Priority Data

Feb. 11, 2014  (IT) .............................. RM2014A0058

(51) Int. Cl.
| C05F 11/02 | (2006.01) |
| B09C 1/08 | (2006.01) |
| B09C 1/10 | (2006.01) |
| C02F 3/34 | (2006.01) |
| B09C 1/00 | (2006.01) |
| C02F 101/00 | (2006.01) |
| C02F 101/20 | (2006.01) |
| C02F 101/32 | (2006.01) |

(52) U.S. Cl.
CPC .............. *C05F 11/02* (2013.01); *B09C 1/002* (2013.01); *B09C 1/08* (2013.01); *B09C 1/105* (2013.01); *C02F 3/341* (2013.01); *C02F 3/342* (2013.01); *C02F 3/347* (2013.01); *C02F 3/348* (2013.01); *C02F 2101/006* (2013.01); *C02F 2101/20* (2013.01); *C02F 2101/32* (2013.01)

(58) Field of Classification Search
CPC . C05F 11/02; B09C 1/002; B09C 1/08; B09C 1/105; C02F 3/348; C02F 3/341; C02F 3/347; C02F 3/342; C02F 2101/20; C02F 2101/006; C02F 2101/32
See application file for complete search history.

(56) References Cited

U.S. PATENT DOCUMENTS

| 5,248,329 A | 9/1993 | Rusin et al. |
| 5,413,624 A | 5/1995 | Rusin et al. |
| 5,766,929 A | 6/1998 | Orolin et al. |
| 6,025,187 A | 2/2000 | Penaud |
| 2002/0090697 A1* | 7/2002 | Hince ..................... B09C 1/002 435/187 |
| 2005/0242025 A1* | 11/2005 | Stock ........................ C02F 3/34 210/610 |

FOREIGN PATENT DOCUMENTS

| AU | 2007 209 830 A1 | 3/2008 |
| CN | 1631849 A | 6/2005 |
| EP | 0 962 492 A1 | 12/1999 |
| FR | 2 658 071 A1 | 8/1991 |
| WO | 2014163471 A1 | 10/2014 |

OTHER PUBLICATIONS

Elise A Asquith et al.: "Comparative Bioremediation of Petroleum Hydrocarbon-Contaminated Soil by Biostimulation, Bioaugmentation and Surfactant Addition", Journal of Environmental Science and Engineering. A, May 1, 2012 (May 1, 2012), El Monte, pp. 637-650, XP055148325, Retrieved from the Internet <URL:http://search.proquest.com/docview/1465964546> [retrieved on Oct. 22, 2014].

Iwona Zawierucha et al.: "Bioremediation of Contaminated Soils: Effects of Bioaugmentation and Biostimulation on Enhancing Biodegradation of Oil Hydrocarbons", In: "Bioaugmentation, Biostimulation and Biocontrol", vol. 108, Jan. 1, 2011, Springer Berlin Heidelberg, Berlin, Heidelberg, ISBN: 978-3-64-219769-7, ISSN: 1613-3382, article pp. 187-201, XP055148639, DOI: 10.1007/978-3-642-19769-7_8.

International Search Report, dated Jun. 5, 2015, from corresponding PCT application.

* cited by examiner

*Primary Examiner* — Jennifer A Smith

(74) *Attorney, Agent, or Firm* — Young & Thompson

(57) ABSTRACT

Biocatalytic composition to be used in the agricultural, zootechnical and environmental recovery fields, to transform substrates which is reacted with, to non-polluting substances, including a component with coenzymatic activity including Vitamin A, Vitamin D3, Vitamin E, Propylgallate, Raw fats, Raw proteins; a component with enzymatic activity including *Bacillus licheniformis*, *Bacillus subtilis*, *Bacillus thuringiensis*, *Bacillus* SPP, *Aspergillus Oryzae*, *Aspergillus Niger*, *Lactobacillus bifidus*, *Lactobacillus acidophilus*, Amylase, Protease, Lipase, Cellulase, Gumase; and a component including substances regulating pH, including Humic acids, Fulvic acids, Crenic acids, Apocrenic acids, Vitamin A, Vitamin D3, Vitamin PP, *Arthrospira maxima*, among others.

16 Claims, No Drawings

BIOCATALYTIC COMPOSITION FOR TREATMENT OF SUBSTRATES

TECHNICAL FIELD

The present invention relates to the field of biocatalytic compositions. More in detail, the present invention relates to a biocatalytic composition adapted to transform organic substrates, which is reacted with, in non-polluting organic compounds ready for a subsequent use. Said biocatalytic composition is applied in the environmental field and in particular in the agriculture, zootechnical and environmental recovery fields.

STATE OF THE ART

The use of nitrogen and nitrogenous substances as fertilizers in the agricultural field is known since a very long time. In fact, nitrogen governs the formation of plant tissues and their expansion as well as the enhancement of absorption of nutritional elements. However, most of the living organisms cannot use the atmospheric nitrogen, hence depending on the amount of nitrogen contained in the minerals of the soil. Nitrogen is present in small amounts in the organic structures of the ground, or anyway in forms little and slowly available for the crops. These forms of nitrogen become available for the crops only after being mineralized by the microflora present in the ground, at first in the form of ammonia and then in nitric form, that is in the forms in which they are absorbed by the roots of plants. Its deficiency in the soil is the main limiting factor for the plant growth. The process by which nitrogen is moving through the living organisms is called "nitrogen cycle". The steps of the nitrogen cycle are: ammonification; nitrification; and assimilation. Despite the nitrogen cycle appears complete and self-sufficient, in reality nitrates are completely lost in the soil and thus removed from the cycle. Furthermore, nitrates are lost following the activities of some bacteria living in the ground that, in the absence of oxygen, cleave the nitrates thereby freeing nitrogen that returns to the atmosphere.

This process is called "denitrification". Among the fertilizers used to enrich the soil of nitrogen, urea is the most widely adopted. Urea, that is a structurally simple molecule being constituted by two $NH_2$ amino groups and one ketonic CO, in the presence of urease enzyme, can decompose developing water and carbon dioxide and produce aqueous ammonia.

Other sources of nitrogen used as fertilizers are: ammonium sulphate; ammonium nitrate; and calcium nitrate. Unfortunately, the substantial production of nitrogenous compounds in solid, liquid and/or gaseous form, as the liquid or gaseous ammonia, nitrites and nitrates, also represents one of the causes of the atmospheric pollution and soil, waterway and aquifer pollutions.

At present various processes are known for the treatment of substrates such as liquid fertilizer and waste waters, which use bacterial cultures, enzymes and yeasts with the purpose of reducing ammonia, and its odor, production. In particular, these compositions contain bacteria such as: *Bacillus subtilis*; enzymes such as: amylase; and yeasts such as: *Saccharomyces cerevisiae*, as described in the document FR 2,658,071. However, the known compositions for the treatment of organic refuse such as excrements, don't allow for the conversion of inorganic nitrogen, that is nitrogen in the form of $NH_4^+$, $NO_2$ and $NO_3$ and urates, in amino acids and proteins, i.e. in organic nitrogenous compounds, but only allow for a reduction in the ammonia development by absorption and solubilization processes.

In light of this, many studies have been directed to the identification of an effective method for the treatment of the concerned waste products or refuse of biological origin as well as the identification of a biocatalytic combination that would allow for the conversion of said substrates in non-polluting organic nitrogenous compounds.

All this in order to prevent the pollution and re-introduce refuse in the anabolism circuit. An example of said treatment is described in the document U.S. Pat. No. 6,025,187. The concerned document relates to a composition comprising bacterial complexes and other substances, able to promote the decomposition and transformation of residues of biological nature in non-polluting organic compounds.

WO2014163471 describes a formulation of biofertilizer based on a particular *Azospirillum* strain able to fix nitrogen. The Application CN 1631849 describes a formulation comprising a biocatalyst constituted by an enzyme-bacterium complex; the necessary enzyme is extracted from the liver of animals.

SUMMARY OF THE INVENTION

Object of the present application for industrial invention, hereinafter described in detail, is to provide a novel biocatalytic composition adapted to transform substrates on which is applied, in non-polluting substances and/or reusable substances and useful in specific fields of application and, in particular, in the agricultural, zootechnical and environmental field. Substrates, on which the composition is applied, are substances and waste or refuse products, or potentially polluting products if released in the environment as they are. Examples of substrates useful for the present invention are: solid and liquid zootechnical waste waters which are composted and/or fresh, chemical fertilizers, dressed farmlands, farmlands with organic residue in excess or residues from chemical fertilizers, grounds polluted by hydrocarbons, heavy metals and/or radiogenic metals, sewage, waters polluted by hydrocarbons, heavy metals and/or radiogenic metals, sewage sludges, urban bio-refuses, landfill sites, biological refuses from food industry (such as for example whey), green compost.

Therefore, it is an object of the present invention a biocatalytic composition according to claim 1.

The biocatalytic composition if the invention comprises at least one component (a) including substances with coenzymatic activity, at least one component (b) including substances with microbial-enzymatic activity, and at least one component (c) including organic acidic substances with pH regulatory function, said biocatalytic composition is characterized in that the components (a-c) are separated from one another until their use and in that the component with coenzymatic activity (component a) comprises Vitamin A, Vitamin B1, Vitamin D3, Vitamin E, Propylgallate, *E. Faecium*, Betaine, Choline, Lactose and raw proteins and raw fats from cow's milk;

the component with microbial-enzymatic activity (component b) comprises a portion of microorganisms (b1) including *B. licheniformis, B. subtilis, B. thuringiensis, B.* SPP, *Aspergillus Oryzae, Aspergillus Niger, Lactobacillus bifidus, Lactobacillus acidophilus*, and an enzymatic portion (b2) including Amylase, Protease, Lipase, Cellulase;

the third component (component c) for pH regulation comprises Humic acids, Fulvic acids, Vitamin A, Vitamin D3, Vitamin PP, *Arthrospira maxima*.

The components (a) and (b) are in powdered form, where the microorganisms are preferably lyophilized, the component (c) is in a liquid form. In the following description by the term biocatalytic composition is meant the sum of the three components (a)-(c) reported above.

As mentioned, the component (a) comprises proteins and raw fats from cow's milk: by the term "proteins and raw fats from cow's milk" proteins and fats are meant that are obtainable from cow's milk in a way known in the art without being isolated or purified.

Proteins and raw fats from cow's milk are commercially available as Solmiko MPC 80 products of the Glanbia Nutritionals company and Anhydrous Milk Fat of the United Dairy Ltd. company. How to obtain proteins and fats from cow's milk is known in the art, for example from the publication J. L. MAUBOIS. *Separation, extraction and fractionation of milk protein components. Le Lait,* 1984, 64 (645-646), pp. 485-495. An example of milk proteins are casein, lactalbumins and lactoglobulins. An example of milk fats are mainly triglycerides but also diglycerides, phospholipids, glycosphingolipids and sterols.

In the following description, the term raw proteins and raw fats will be used for the sake of simplicity to indicate the above identified products, as obtainable from cow's milk; proteins and raw fats obtainable by other means and equivalent to above identified proteins and fats, are included in the purpose of the invention. Such proteins and raw fats present in component (a) are important as they impart to the microorganisms, at the time of rehydration, the nutritional and enzymatic substances necessary to their optimal metabolic re-activation.

A further object of the invention is a method for applying the composition of the invention, according to claim 9. Further objects of the invention are the use of the composition according to claims 14 to 21.

The biocatalytic composition of the invention is particularly effective and versatile: in fact said composition lends itself to promote not only the transformation of the polluting substances deriving from the mentioned fields, to agents not harmful and reusable in the agricultural field as fertilizers, but also the treatment of polluting waste waters.

A further surprising advantage of the invention is that it could act as fertilizer in amounts dramatically reduced compared to those necessary for a normal fertilizer. In fact, the amount of composition applied to the ground is comprised in the range between 1.35 and 2.85 kg/ha (kilograms per hectare), preferably in the range between 1.65 and 2.45 kg/ha, more preferably 1.9-2.25 kg/ha. The amount of above mentioned composition is referred to the total composition, i.e. (a)+(b)+(c), prior to its dilution in water.

In case of application to a substrate in the zootechnical field and bioremediation, the amount of above mentioned composition indicated above is applied in an amount of substrate comprised between 50 and 100 sqm (squared meters); in case of a substrate containing radiogenic metals, the amount of substrate can also drop to 10 sqm, thus in a range of 10-100 sqm.

It was also ascertained that the component (c) of the composition of the invention, as defined for example in claims 1 and 4, can advantageously be used for ground fertilization or leaf fertilization, even alone as well as in combination with components (a) and (b).

It was also ascertained that, in agriculture, the best results in terms of amounts and organoleptic qualities are obtained through the use of the combination of (a), (b) and (c) for preparing the composition of the invention, followed by the use of the component (c) as leaf fertilizer and subsequently again by the component (c) as a leaf fertilizer.

The composition of the invention can be used in agriculture both at the soil and leaf and shrub level.

DESCRIPTION OF THE INVENTION

The present invention relates to a novel biocatalytic composition adapted to promote the transformation of polluting substances in compounds not harmful and/or reusable for the environment. More specifically, the present invention relates to a biocatalytic composition applied in agricultural, zootechnical and environmental fields, for degradation and transformation of polluting substances contained in the soil and/or water basins, deriving from the degradation processes of some agricultural dressing and/or plant organic refuses and/or animal organic refuses, as well as animal carcasses and/or hydrocarbons and/or heavy metals and/or metals with a slight radiogenic load. The biocatalytic composition in question is a composition substantially comprising three components, wherein each of said components plays a key role in effectiveness and specificity of the required treatment. Each component is a subset of substances that perform coenzymatic, enzymatic and fermentative activity. In particular the concerned composition, comprising at least one component with coenzymatic activity, at least one component with enzymatic activity, and at least one component adapted to optimize the reaction conditions regulating the pH, includes: enzymes, coenzymes and microbial strains that allow the fermentative process to occur very quickly. All this thanks also to the presence of other acidic substances (e.g. humic acids in general) that enhance and speed up the evolution of the transformation by optimizing the pH and reaction conditions.

More in detail, the biocatalytic composition in question is a set of selected cultures of alive, aerobic, anaerobic and optionally anaerobic fungi and bacteria, and hydrolytic organic catalysts (C.O.I.) in high concentration. Said composition comprises selected primary cultures, for example of the following bacteria and fungi: *Bacillus subtilis, Aspergillus oryzae, Lactobacillus bifidus, Lactobacillus acidophilus, Bacillus thuringiensis, Aspergillus niger,—Bacillus* spp, etc. which are cultured separately and subsequently mixed together. The microorganisms of the composition in question are presented in a lyophilized and/or powdered form: the cells are dried, thus stopping their activity but leaving them unchanged and alive and able to resume activity and multiply if brought again in conditions of sufficient humidity and temperature.

These cultures, produced from wild cultures and free from any form of genetic manipulation, are not pathogenic, are free from salmonella, are harmless to humans, animals and fish.

The composition in question also comprises, as mentioned, a component performing catalytic activity, this is a set of hydrolytic organic catalysts that are complex organic macromolecules of protein origin produced by bacterial cells. These substances promote and accelerate the rate of redox reactions that degrade the organic compounds, are not destroyed in the reactive process but remain active over time.

The hydrolytic organic catalysts of the composition object of the present description are relatively sensitive to the environmental conditions of temperature and pH. The optimal temperature for the C.O.I. is comprised between 40° C. and 50° C. Each deviation of 10° C. centigrade below the optimal temperature reduces the C.O.I. activity of the composition by 30% therefore, approximately, around 10° C. it doesn't exceed 10-15% of the maximum potentiality. Anyway the activity ceases around 3° centigrade. The concerned C.O.I. are: amylases that hydrolyze, liquefy, digest substrates containing starches, transforming them into simpler and more soluble sugars. They have an activity similar to alpha and beta amylases, Diastasis, Isoamylase, Pullulanase, Amyloglucosidase, Glucoamylase etc. Proteases hydrolyze, decompose and solubilize proteins accumulating and determining the breaking of the bonding that link the various amino acids to each other, forming more or less long chains (polypeptides and proteins). They have an activity similar to Proteases, Proteinases, Peptidases, etc.

Water-soluble and water dispersible lipases hydrolyze, degrade animal fats, vegetable oils, food fats, by removing obstacles and clogging caused by them. They are not active on hydrocarbons and mineral oils. Yet lipases act in depth when the products in which they are contained are added with a surfactant improving the emulsion of oils and fats, thus increasing the surface of attack.

In summary, the three above said categories of hydrolytic organic catalysts are active in accelerating the hydrolysis, namely the progressive digestion and decomposition of starches and proteins, animal and plant lipids, that are the main organic constituents of the wastes by breeding farms, food industries, composting centers, purifiers and others. Such a hydrolytic process consequently involves the reduction in size of the molecules and thus the fluidization of organic masses. More clearly, the action of the bacterial cultures—organic catalyst systems, leads to the liquefaction of solid materials continuously restoring and reinforcing the microflora useful in plants for the biological treatment and depuration of organic refuses. The microbial-enzymatic components of the biocatalytic composition object of the present invention, after their state of latency produced by lyophilization or pulverization, are activated by coenzymatic elements, lipoproteins, vitamins, sugars, amino acids etc., that give way to the metabolic action of complex degradation by feeding the microorganism waking up from its own stasis.

More in detail, purpose of the present invention is to provide a system of substances that, conveniently combined, are able to restore, activate and re-balance the biochemistry of the substrate they are interacting with, i.e. a farmland and/or organic substrate in decomposition and/or earthy or watery substrate. All this by conveniently applying specific substances, and in particular specific bacterial—enzymatic—fungal mixtures. The result of such an application is: in the agricultural and zootechnical field, obtaining substances with soil fertilizing properties; and in the environmental field, specifically for the treatment of polluted water such as waste waters, landfill leachates and similar, obtaining non-polluting and/or even reusable waters in the agricultural field, for example for the irrigation of farmlands and for environmental recovery of ground polluted by hydrocarbons and/or heavy metals and/or metals with low radiogenic load. The treatment allows the subsequent use of these grounds for civil use or crops with the purpose of producing bioenergy.

DETAILED DESCRIPTION OF THE INVENTION

The present invention provides a novel biocatalytic composition adapted to transform substrates of organic nature in fertilizers useful in the agricultural field and/or transform polluted and/or pollutant substrates in products non-toxic for the environment and, eventually, reusable in the agricultural field. The fields the substrates belong to, which the composition in question is conveniently applied to, are: the farmland one; zootechnical, meaning stables, piggeries, fish environments, chicken coops etc.; the waste water one, that of polluted water basins and that of polluted grounds.

More in detail, the biocatalytic composition in question is a mixture of substances, of bacterial—enzymatic—fungal nature, that conveniently combined and activated in specific temperature and humidity conditions, allow to transform substrates they interact with in non-toxic substances at the environmental level and/or with fertilizing properties.

For example, in the agricultural field, the inoculum of the biocatalytic composition in question, optimizes the kinetics of fundamental reactions of biocatalysis, activates and stimulates the microbial activity and the respective metabolic activity in the soil, by activating the mineralization of the organic substance (OS) and transforming it in assimilable substances and optimizing the transfer of nutritional elements in the plant's food chain. More specifically, the composition consists of a bacterial—enzymatic—fungal mixture (selected antagonistic mycetes), silica and carbonic substrates, microalgae, humic and fulvic organic acids, and is initially presented in a lyophilized form. As already mentioned, the enzymes combined with the microorganisms present in the composition, are of hydrolytic nature, that is hydrolytic organic catalysts, herein indicated as C.O.I.

Lipoproteins, sugars, vitamins and other coenzymes activate the activity of microorganisms and enzymes constituting the composition, whose activity is enhanced thanks to the presence of a liquid oligomeric component represented by substances containing relatively long chains of carbon atoms.

In particular, when inoculated in the ground or on the leaf and shrub part of the plants, the mycetes included in the composition in question, in particular *Trichoderma harzianum* and *Trichoderma* spp, synergistically operating as BCA—Biological Control Agents—, whose activity and effectiveness is further increased by the specific presence of other microorganisms included in the composition, promote an antagonist action expressed by secondary metabolites biologically active against a very wide series of pathogenic fungi and parasites. The active substance is 6-pentyl-alpha-pyrone (6PAP), produced by the interaction of the various *Trichoderma* present totally blocking the germination of conidia of the parasite, the spores asexually produced in ascomycete fungi, basidiomycetes and deuteromycetes, intended to be dispersed in the air to give rise to a new mycelium. The use of mixtures based on endophytic fungi and, in particular, the use of their secondary metabolites considered toxic to the pathogen, allows to reduce the possibility of using metals such as copper, of which the negative effect on the ground is known when present within the latter in a relatively high concentration. Mycetes of ectotrophic Mycorrhiza type remain outside the cortical cells forming a mantle-like surface, whereas the endotrophic ones, endomycorrhiza, penetrate within the radical cortex of plants without altering the viability. Several microorganisms of the concerned composition play an inhibitory action against the detrimental activity of metals present in the soil, playing a chelating action to these. In particular, when inoculated in the ground or on the leaf and shrub part of plants, the microorganisms comprised in the composition in question, in particular *Bacillus thuringiensis* and *Aspergillus oryzae*, synergistically operating as BCA—Biological Control Agents—, whose activity and effectiveness is further increased by the specific presence of the other microorganisms comprised in the composition, promote an antagonistic action expressed by secondary metabolites biologically active against a very wide series of parasite insects. The active substances are endotoxins in the form of crystalloid, such as delta-endotoxins produced by *B. thuringiensis*, which, when ingested, cause lysis of cells of the digestive system both in larvae and in adult insects. The composition in question also comprises a component of oligomeric nature, presenting a relatively long chain of carbon atoms, adapted to enhance the activity itself of the composition: it is an organic component comprising humic acid, fulvic acid, crenic acid, that are combined and associated with nitrogen-fixing elements "N", organic carbon "C", organic phosphorus "P", organic potassium "K", magnesium, calcium and other minerals. Depending on the type of substrate, the composition in question also provides for the addition of a further component with phytostimulating action comprising vitamins, phytoproteins, flavonoids, amino acids, macro and micro nutrients, algae such as *Arthrospira maxima* and *Ascophyllum nodosum*, and other substances of organic nature enhancing the photosynthesis activity balancing. When applied to substrates belonging to agricultural and zootechnical field, the composition in question promotes a fertilizing action. The fertilizing action, according to current regulations in the field of application of the invention, is not only given by the nutritional contribution, such as in the case of dressing, but also by degradation, digestion and transformation of the organic substance, OS, during mineralization and humidification processes.

Herein below is reported a list including the components present in the composition in question as a function of the use said composition is intended to. More clearly, the list below shows the components of the composition for its use in agricultural, zootechnical, and environmental field, meaning the use, for the latter field, of the composition for the treatment of waste waters, polluting and/or polluted leachates and aquifers and polluted ground.

According to the present invention, the composition always has, for all applications, a base formulation comprising at least one component (a) including substances with coenzymatic activity, at least one component (b) including substances with enzymatic activity, and at least one component (c) including organic acidic substances with pH regulatory function. The components (a-c) are preferably separated from one another until their use and, in particular, components a and b are preferably in a powdered form containing lyophilized microorganisms, and component c is in a liquid form.

In the preferred embodiments of the invention, the component with coenzymatic activity (a) comprises Vitamin A, Vitamin B1, Vitamin D3, Vitamin E, Propylgallate, *E. Faecium* spp, Betaine, Choline, Lactose, raw proteins and raw fats from cow's milk;
the component with enzymatic activity (b) comprises a portion of microorganisms (b1) including *B. licheniformis, B. subtilis, B. thuringiensis, B.* SPP, *Aspergillus Oryzae, Aspergillus Niger, Lactobacillus bifidus, Lactobacillus acidophilus*, and one enzymatic portion (b2) including Amylase, Protease, Lipase, Cellulase;
the component (c) for pH regulation comprises Humic acids, Fulvic acids, Vitamin A, Vitamin D3, Vitamin PP, *Arthrospira maxima*.

In exemplary embodiments, the components have the following compositions by weight based on the weight of each component:
for component (a): Vitamin A 1.5-3%, Vitamin B1 0.1-1.0%, Vitamin D3 0.5-3.0%, Vitamin E 0.1-1.0%, Propylgallate 5-15%, *E. Faecium* SPP $10^6$-$10^9$ CFU/kg; Betaine 0.1-1.0%, Choline 0.1-1.05, Lactose 30-40%, Raw proteins 18-25%, Raw fats 15-20%;
for component (b): *B. licheniformis* 10-20%, *B. subtilis* 15-35%, *B. thuringiensis* 5-15%, *B.* SPP 5-15%, *Aspergillus Oryzae* 15-30%, *Aspergillus Niger* 5-15%, *Lactobacillus bifidus* 2-8%, *Lactobacillus acidophilus* 5-15%, Amylase, Protease, Lipase, Cellulase each being present in a range of 1-11%, their sum (b2) being comprised between 10 and 15% by weight;
for component (c): Humic acids and Fulvic acids each are present in a range of 1-38%, their sum being comprised between 27 and 39% by weight, Vitamin A 2-6%, Vitamin D3 8-14%, Vitamin PP 10-15%, *Arthrospira maxima* 26-53%.

Depending on the use of the composition of the invention, the formulations can be completed with additional components.

More in detail, for the application in the agricultural field of the composition of the invention, component (b) further comprises one additional component (b3) consisting of one or more of the following microorganisms: *Lactobacillus lactis; Ruminococcus albus; Bacillus cereus; Pseudomonas fluorescens; Pichia pastoris; Nitrobacter winogradskyi; Nitrosomonas europea; Azomonas; Thiobacillus; Paenibacillus; Rhizobium; Azospirillum; Frankia; Burkholderia; Agrobacterium; Arthrobacter; Streptomyces griseus; Azotobacter; Pseudomonas chlororaphis; Bacillus megaterium; Cellulomonas biazotea; Nitrobacter* SPP; *Agrobacterium radiobacter; Trichoderma viride; Trichoderma harzianum; Trichoderma atroviride; Clonostachys rosea; Beauveria* SPP; *Metarhizium anisopliae; Paecilomyces lilacinus; Ulocladium* SPP; *Glomus caledonium; Glomus coronatum; Glomus intraradices; Glomus mosseae; Glomus viscosum*. wherein the amount of said additional component (b3) is comprised in the range between 15 and 55% by weight of component (b), the sum of the amount of Amylase, Protease, Lipase, Cellulase (b2) is in the range between 10 and 15% by weight and the amount by weight of said portion of microorganisms (b1) is comprised in the range between 35 and 70% based on the total weight of component (b).

In the composition reported above, for agricultural use, the third component (c) further comprises up to 15% by weight crenic and/or apocrenic acids and up to 35% by weight of *Ascophyllum nodosum* and/or *Arthrospira Platensis*.

For use in the zootechnical field, the composition has a component (b) further comprising an additional component (b3) consisting of one or more of the following microorganisms: *Lactobacillus lactis; Ruminococcus albus; Pseudomonas fluorescens; Bacillus cereus; Pichia pastoris*; preferably, the amount of said additional component (b3) is comprised in the range between 15 and 55% by weight of component (b), the sum of the amount of Amylase, Protease, Lipase, Cellulase (b2) is in the range between 10 and 15% by weight and the amount by weight of said portion of microorganisms (b1) is comprised in the range between 35 and 70% based on the total weight of component (b).

Preferably, in the composition for zootechnical application illustrated above, the third component (c) further comprises from 25 to 35% by weight of *Arthrospira Platensis*.

The composition of the invention can also be used in the environmental bioremediation field. For that purpose, in a preferred formulation of the composition, component (b) further comprises an additional component (b3) consisting of one or more of the following microorganisms: *Lactobacillus lactis; Ruminococcus albus; Bacillus cereus;*

*Pseudomonas fluorescens; Streptomyces* SPP; *Pseudomonas denitrificans; Pseudomonas putida; Bacillus amyloliquefaciens; Aspergillus* app; *Deinococcus radiodurans; Geobacter; Acinetobacter; Agrobacterium radiobacter.*

In particular, the amount of additional component (b3) is comprised in the range between 15 and 55% by weight of component (b), the sum of the amount of Amylase, Protease, Lipase, Cellulase (b2) is in the range between 10 and 15% by weight and the amount by weight of said portion of microorganisms (b1) is comprised in the range between 35 and 70% based on the total weight of component (b).

In a possible embodiment of the invention, the amounts of components (expressed in grams) are distributed as follows: component (a) between 350 and 450 grams, preferably 400 grams; component (b) between 550 and 800 grams, preferably between 600 and 750 grams; component (c) about 1 liter (approximately 1000 grams). In particular, component (c) contains about 99% water.

The preparation method of the composition of the invention for its use comprises the mixing steps of components (a) and (b) in a pre-fixed proportion to the total of the biocatalytic composition; more in particular, the percentage is 15-25% for component (a) and 30-40% for component (b), on the a+b+c total.

The two components (a) and (b) are mixed and dispersed in an amount of water at a temperature between 30 and 40° C. corresponding to 690%-2200% by weight of components (a) and (b) added together and maintained to such a temperature for a period of time comprised between 30 minutes and 1 hour and 20 minutes.

For example, 400 g (a) and 600 g (b) are mixed with 10 liters water and maintained at 35° C. for 1 hour.

Subsequently, the so-obtained aqueous mixture is further diluted in water in such a way that the total of the catalytic composition, i.e. the total of the components (a)-(c), is present in an amount comprised between 0.15% and 1.5% by weight to the final solution/dispersion. The component (c) is added in such a final dilution step in a proportion of 35-50% by weight to the total of the biocatalytic composition (a+b+c). Thus, the so obtained diluted composition is applied to a substrate to be treated.

It should be noted that, in a preferred process, the used water is unchlorated water and anyway free of chlorine or agents containing chlorine or biocide substances such as those used in waterworks.

The following examples illustrate possible compositions in different application fields.

Example 1—Agricultural Field

Component (a): Nutri-Powder.
  Vitamin A, Vitamin D3, Vitamin E, Propylgallate,
  Raw fats and raw proteins from cow's milk
  *E. Faecium* spp preferably selected from Cernelle 68 and M74 NCIMB 11181.
Component (b), Microorganisms Enzymes—Powder:
  *Bacillus licheniformis, Bacillus subtilis, Bacillus cereus, Bacillus thuringiensis, Bacillus* SPP, *Aspergillus Oryzae, Aspergillus Niger, Lactobacillus bifidus, Lactobacillus acidophilus, Lactobacillus lactis, Bacillus cereus*
  *Ruminococcus albus,*
  *Pseudomonas fluorescens,*
  Amylase, Protease, Lipase, Cellulase, Gumase, Lipidase, *Pichia pastoris, Agrobacterium radiobacter,*
  *Nitrobacter winogradskyi, Azomonas, Thiobacillus, Paenibacillus, Rhizobium, Azospirillum, Frankia, Burkholderia, Agrobacterium, Arthrobacter, Streptomyces griseus, Azotobacter, P. chlororaphis, Bacillus megaterium, Cellulomonas biazotea, Nitrobacter* SPP,
Saprophytic fungi such as:
  *Trichoderma viride, Trichoderma harzianum, Trichoderma atroviride, Clonostachys rosea, Beauveria* SPP, *Metarhizium anisopliae,*
  *Paecilomyces lilacinus, Ulocladium* SPP
Symbiotic fungi such as:
  *Glomus caledonium, Glomus coronatum, Glomus intraradices,*
  *Glomus mosseae, Glomus viscosum.*
Component (c), Oligomeric Liquid:
  Humic acids, Fulvic acids, Crenic acids, Apocrenic acids, Vitamin A, Vitamin D3, Vitamin PP,
  *Arthrospira maxima, Ascophyllum nodosum*

Example 2—Zootechnical Field

Component (a), Nutri-Powder:
  Vitamin A, Vitamin D3, Vitamin E,
  Propylgallate,
  Raw fats and raw proteins from cow's milk
  *E. Faecium* preferably selected from Cernelle 68 and M74 NCIMB 11181.
Component (b), Microorganisms Enzymes—Powder:
  *Bacillus licheniformis, Bacillus subtilis, Bacillus cereus, Bacillus thuringiensis, Bacillus* SPP, *Bacillus cereus*
  *Aspergillus Oryzae, Aspergillus Niger,*
  *Lactobacillus bifidus, Lactobacillus acidophilus, Lactobacillus lactis,*
  *Ruminococcus albus, Pseudomonas fluorescens,*
  Amylase, Protease, Lipase, Cellulase, Gumase, Lipidase, *Pichia pastoris.*
Component (c), Oligomeric Liquid:
  Humic acids, Fulvic acids, Crenic acids, Apocrenic acids, Vitamin A, Vitamin D3, Vitamin PP,
  *Arthrospira maxima, Arthrospira platensis*

Example 3—Environmental Field

Component (a), Nutri-Powder:
  Vitamin A, Vitamin D3, Vitamin E,
  Propylgallate,
  Raw fats and raw proteins from cow's milk
  *E. Faecium*, as described above.
Component (b), Microorganisms Enzymes—Powder:
  *Bacillus licheniformis, Bacillus subtilis, Bacillus cereus, Bacillus thuringiensis, Bacillus* SPP, *Bacillus cereus*
  *Aspergillus Oryzae, Aspergillus Niger,*
  *Lactobacillus bifidus, Lactobacillus acidophilus, Lactobacillus lactis,*
  *Ruminococcus albus, Pseudomonas fluorescens,*
  Amylase, Protease, Lipase, Cellulase, Gumase,
  *Streptomyces* SPP, *Pseudomonas denitrificans, Pseudomonas putida,*
  *Bacillus amyloliquefaciens, Aspergillus Wije, Deinococcus radiodurans,*
  *Geobacter, E. coli, Acinetobacter, Agrobacterium radiobacter.*
Component (c), Oligomeric Liquid:
  Humic acids, Fulvic acids, Crenic acids, Apocrenic acids, Vitamin A, Vitamin D3, Vitamin PP
  *Arthrospira maxima*

The invention claimed is:

1. A biocatalytic composition comprising:
    a component (a) having coenzymatic activity and comprising at least one of: 1.5-3 wt % vitamin A, 0.1-1.0 wt % vitamin B1, 0.5-3.0 wt % vitamin D3, 0.1-1.0 wt % vitamin E, 5-15 wt % propylgallate, $10^6$-$10^9$ CFU/kg *Enterococcus faecium* (M74, NCIMB 11181); 0.1-1.0 wt % betaine, 0.1-1.05 wt % choline, 30-40 wt % lactose, 18-25 wt % raw proteins and 15-20 wt % raw fats;
    a component (b) having microbial-enzymatic activity and comprising microorganisms (b1) including at least one of: 10-20 wt % *Bacillus licheniformis*, 15-35 wt % *Bacillus subtilis*, 5-15 wt % *Bacillus thuringiensis*, 5-15 wt % *Bacillus* spp, 15-30 wt % *Aspergillus oryzae*, 5-15 wt % *Aspergillus niger*, 2-8 wt % *Lactobacillus bifidus* and 5-15 wt % *Lactobacillus acidophilus*; and enzymes (b2) including at least one of amylase, protease, lipase and cellulase each in a range of 1-11 wt %, a sum of said enzymes (b2) being comprised between 10 and 15 wt %; each weight percent based on a total weight of component (b); and
    a component (c) having pH regulatory function and comprising at least one of: humic acids and fulvic acids each present in a range of 1-38 wt %, their sum being comprised between 27 and 39 wt %, 2-6 wt % vitamin A, 8-14% vitamin D3, 10-15 wt % vitamin PP and 26-53 wt % *Arthrospira maxima*; each weight percent based on a total weight of component (c);
    wherein said components (a-c) are separated from one another until their use.

2. The biocatalytic composition according to claim 1, wherein said component (b) further comprises a component (b3) consisting of at least one of the following microorganisms: *Lactobacillus lactis; Ruminococcus albus; Pseudomonas fluorescens; Bacillus cereus; Pichia pastoris; Nitrobacter winogradskyi; Nitrosomonas europea; Azomonas; Thiobacillus; Paenibacillus; Rhizobium; Azospirillum; Frankia; Burkholderia; Agrobacterium; Arthrobacter; Streptomyces griseus; Azotobacter; Pseudomonas chlororaphis; Bacillus megaterium; Cellulomonas biazotea; Nitrobacter* spp; *Agrobacterium radiobacter; Trichoderma viride; Trichoderma harzianum; Trichoderma atroviride; Clonostachys rosea; Beauveria* spp; *Metarhizium anisopliae; Paecilomyces lilacinus; Ulocladium* spp; *Glomus caledonium; Glomus coronatum; Glomus intraradices; Glomus mosseae;* and *Glomus viscosum*; and
    wherein said component (b3) is present at 15-55 wt % of component (b), a sum of amylase, protease, lipase and cellulose in component (b2) is 10-15 wt % of component (b) and said microorganisms (b1) are present at 35-70 wt % of component (b).

3. The biocatalytic composition according to claim 2, wherein said component (c) further comprises *Ascophyllum nodosum* and/or *Arthrospira Platensis* up to 35% by weight.

4. The biocatalytic composition according to claim 1, wherein said component (b) further comprises a component (b3) consisting of one or more of *Lactobacillus lactis; Ruminococcus albus; Pseudomonas fluorescens; Bacillus cereus* and *Pichia pastoris*; and
    wherein said component (b3) is present at 15-55 wt % of component (b), a sum of amylase, protease, pipase and cellulase in component (b2) being 10 and 15 wt % of component (b) and said microorganisms (b1) being present at 35-70 wt % of component (b).

5. The biocatalytic composition according to claim 4, wherein said component (c) further comprises *Arthrospira platensis* at 25-35 wt % of said component (c).

6. The biocatalytic composition according to claim 1, wherein said component (b) further comprises a component (b3) consisting of one or more of the following microorganisms: *Lactobacillus lactis; Ruminococcus albus; Pseudomonas fluorescens; Streptomyces* spp; *Bacillus cereus; Pseudomonas denitrificans; Pseudomonas putida; Bacillus amyloliquefaciens; Aspergillus* app; *Deinococcus radiodurans; Geobacter; Acinetobacter; Agrobacterium radiobacter*; and
    wherein said component (b3) is present at 15-55 wt % of component (b), the sum of the amount of Amylase, Protease, Lipase, Cellulase (b2) is in the range between 10 and 15% by weight and wherein the amount by weight of said portion of microorganisms (b1) is comprised in the range between 35 and 70% based on the total weight of component (b).

7. The biocatalytic composition according to claim 1, wherein said component (a) and said component (b) are in a powdered form and said component (c) is in a liquid form.

8. A method for preparing and applying a biocatalytic composition according to claim 1 in agriculture, zootechnical or environmental bioremediation, comprising
    mixing said components (a) and (b) in a proportion of 15-25 wt % for component (a) and 30-40 wt % for component (b) to a total weight of components (a), (b) and (c), in an amount of water at a temperature between 30 and 40° C., said amount of water corresponding to 690%-2200% by weight of components (a) and (b) added together, for a period comprised between 30 minutes and 1 hour 20 minutes, to form a mixture;
    diluting said mixture in water with a dilution comprised between 0.15% and 1.5% of a total weight of components (a), (b) and (c), adding said component (c) in a proportion of 35-50% to a total weight of components (a), (b) and (c) to form said biocatalytic composition; and
    applying said biocatalytic composition to a substrate to be treated.

9. The method according to claim 8, wherein said substrate to be treated is selected from organic refuse, settling tanks of municipal or zootechnical wastewater, ground or water.

10. The method according to claim 8, wherein said substrate is biological wastes of industrial production of food.

11. The method according to claim 8, wherein said substrate is selected from farmland and cultivated plants, said method comprising applying said biocatalytic composition according to said substrate, in an amount of 1.35-2.85 kg/ha.

12. The method according to claim 11, wherein said amount is 1.65-2.45 kg/ha.

13. A method for treating substrates of animal origin comprising excrements and/or animal carcasses, said method comprising applying the biocatalytic composition according to claim 4 to said substrates.

14. A method for treating polluted and/or pollutant waters, comprising applying the biocatalytic composition according to claim 6 to said waters.

15. A method for treating polluted and/or pollutant grounds, comprising applying the biocatalytic composition according to claim 6 to said grounds.

16. A method for ground fertilization or leaf fertilization, comprising applying the biocatalytic composition according to claim 2 to said ground or leaf.

\* \* \* \* \*